United States Patent [19]
Bonicel et al.

[11] Patent Number: 5,235,415
[45] Date of Patent: Aug. 10, 1993

[54] DEVICE FOR THE INTELLIGIBLE CONSULTATION OF DATA RELATING TO THE FEES PROGRAMS OF A SUBSCRIPTION TELEVISION AND/OR RADIO SERVICE

[75] Inventors: Pierre Bonicel, Liffre; Jean-Pierre Heon, Betton; Christian Gautier, Acigne, all of France

[73] Assignees: Centre National d'Etudes des Telecommunications; Telediffusion de France, both of France

[21] Appl. No.: 630,048

[22] Filed: Dec. 19, 1990

[30] Foreign Application Priority Data
Dec. 22, 1989 [FR] France .................. 89 17287

[51] Int. Cl.$^5$ .................. H04N 7/00; H04N 7/10
[52] U.S. Cl. .................. 358/84; 358/86; 455/6.2
[58] Field of Search .................. 455/2, 3, 6; 358/84, 358/86

[56] References Cited
U.S. PATENT DOCUMENTS

| | | | |
|---|---|---|---|
| 4,337,483 | 6/1982 | Guillou | 358/141 |
| 4,862,268 | 8/1989 | Campbell et al. | 380/5 |
| 4,890,319 | 12/1989 | Seth-Smith et al. | 380/20 |

Primary Examiner—Reinhard J. Eisenzopf
Assistant Examiner—Almaz Woldu
Attorney, Agent, or Firm—Locke Reynolds

[57] ABSTRACT

A device for allowing fee paying subscribers access to television or radio programs includes a keyboard unit for requesting messages concerning the programs. Information describing the program fees and account status is contained in a subscriber held security processor such as a smart card. As a function of the content of the requests a mechanism converts the information contained in the security processor into intelligible messages as a function of complementary information transmitted regularly within television and/or radio signals.

13 Claims, 2 Drawing Sheets

1

DEVICE FOR THE INTELLIGIBLE CONSULTATION OF DATA RELATING TO THE FEES PROGRAMS OF A SUBSCRIPTION TELEVISION AND/OR RADIO SERVICE

BACKGROUND OF THE INVENTION

1. Field of the Invention

The field of the invention is that of subscription television and radio.

More precisely, the invention concerns a device for assisting a user having purchased fees entitling him to have access to television and radio programs.

2. Description of the Prior Art

There are many known subscription television systems in which the programs are transmitted in scrambled form. The user selects those items of a program that he wishes to view and pays the corresponding fees. These fees correspond, for example, to the acquisition of a particular key for the descrambling of the programs received.

A subscription television system such as this provides the facility of advance buying, namely the payment of fees, for example in the form of a monthly subscription, enabling him to view an item of a program. It may also enable impulse buying giving the user the possibility of paying a fee to view an item of a program only when it is broadcast.

The systems for controlling access to television programs, notably the system described in the "Eurocrypt" specifications, implement a security processor, notably in the form of a microprocessor card. In addition to a certain number of mechanisms related to the reliability of the system in terms of inviolability, a certain number of elements are defined in these processors: these are elements representing the facilities for marketing audio-visual products.

Thus, the "Eurocrypt" specifications provide for possibilities of selective access to certain subjects (sports, theater etc.), for groups of users (doctors, garage mechanics etc.), for certain periods etc.

The management of an access control service is done notably through values of identifiers and flags or indicators. These elements are found, in the same form, in the safety processor of the user's decoder. It is then difficult to consult the user's account status recorded in this processor.

If necessary, the user may display certain pieces of information contained in the processor. However, these pieces of information cannot be directly interpreted since they are in digital form. The interpretation calls for transcoding tables which can be consulted, for example, through a Teletel type information-retrieval center, outside the context of use of the security processor, or in a center qualified to fulfil this function.

Furthermore, existing subscription television services do not give the user any indication of management as regards the possibilities offered by those providing programs. The information presented is not enough for to let the user choose and acquire an item of a program, whether it is in advance or on impulse.

The European patent document 0 243 312 (Method To Facilitate Dialogue Between A Subscriber To A Subscription Television System And A Decoder Of The Signals Received, And A Decoder Of These Signals) concerns a method for the transmission of information on television programs and the modalities of subscribing to them in teletext form. However, the information transmitted is common to all the users and is not related to the information contained in the security processor of a particular user. Thus, for example, it is not possible to transmit specific information to the group of users who are doctors, or to a user having a particular type of basic subscription.

It is an aim of the invention, notably, to overcome these drawbacks.

SUMMARY OF THE INVENTION

More precisely, the invention is aimed at providing a device that enables the user to restore information, recorded in the security processor of a subscriber television decoder, in intelligible form.

It is an additional aim of the invention to provide a device such as this enabling the display of regularly updated information.

It is another aim of the invention to provide a device such as this, wherein additional information, concerning notably the content of the television and/or radio programs and the fee-paying procedures are also accessible to the user.

It is also an aim of the invention to provide a device such as this, enabling operations such as the buying of programs or the consultation of the account status recorded in the security processor to be done in a social context by a group.

These aims, as well as others that will appear here below, shall be achieved by means of a device for the intelligible consultation of the nature of the fees and programs purchased by a user of a television and/or radio service, including means for the expression of requests by the user, means for the processing of the information describing said fees and the account status, contained in a safety processor, as a function of the content of said requests, and means for the restoring or restitution of said processed information, the processing means transcribing the information contained in said security processor into intelligible messages, as a function of complementary information transmitted regularly within television and/or radio signals.

Thus, the device according to the invention is capable, at the user's request, of reading the pieces of data contained in the security processor, transcribing them into intelligible form by means of the data transmitted and finally restoring them to the user. The transmitted information may take the form of correspondence tables wherein, with each piece of encoded information capable of being recorded in the processor, there is associated a piece of information that can be directly interpreted by the user.

Since the complementary information is transmitted regularly, it is easy to adapt it according to time and events, bring it up to date, etc.

Besides, the fact of transmitting only information on transcription and not pages of text provides for an optimum presentation of information at the receiver, for example as a function of the pieces of information present in the security processor, the type of receiver and the wishes of the user.

Advantageously, the intelligible messages include at least one of the pieces of information belonging to the group including:

program titles;
information on subjects and/or levels;
information on classes of programs;
information on timings of shows;

information on geographical zones;
information on moral rating;
information on price;
information on time schedules;
information for groups of users.

In one preferred embodiment of the invention, the complementary information is transmitted by means of a teletext message system.

The invention thus presents a new use of these message systems. For, it is no longer fixed screen pages that are transmitted but transcription information not designed to be displayed directly on a screen.

In this case, the data of said teletext message system is advantageously transmitted in the flyback frames and/or flyback lines of the television signals and/or in the data packets, in the case of video signals including a multiplex of image signals and/or data.

In a particular embodiment of the invention, the restitution means are constituted by display means, including character generator means, notably for display according to a teletext standard.

Preferably, the security processor is placed on a detachable object such as a microprocessor card.

Advantageously, the processing means also use information on the television and/or radio programs contained in a second teletext message system. The access to the information on the television programs may then depend on the information on fees and account status in the security processor.

Advantageously, this second message system uses the information on transcription transmitted by the first message system so as to prevent a transmission of redundant information. In other words, the second message system uses codes identical to those present in the security processors, and the receiver carries out an interpretation similar to the one done for the reading of the account status recorded in the processor.

In a preferred embodiment of the invention, the second teletext message system includes a "current" page that carries information on the programs currently being transmitted and is transmitted at higher speed than the other pages of the second message system, and a "window" space containing information accessible when no fee has been paid.

The invention of course also concerns a device for the transmission of television and/or radio signals compatible with intelligible consultation devices such as these, including means for the regular transmission of complementary information designed for the transcription of the information contained in security processors into intelligible messages.

BRIEF DESCRIPTION OF THE DRAWINGS

Other features and advantages of the invention will appear from the following description of a preferred embodiment of the invention, given as a non-restrictive illustration, and from the appended drawings of which.

DESCRIPTION OF A PREFERRED EMBODIMENT

The preferred embodiment described concerns a device fitted into a subscription television signal decoder implementing the "Eurocrypt" specifications. However, the invention can be applied equally well to all subscription television and/or radio systems irrespectively of the principles governing their access control, scrambling and medium of transmission.

Figure 1:
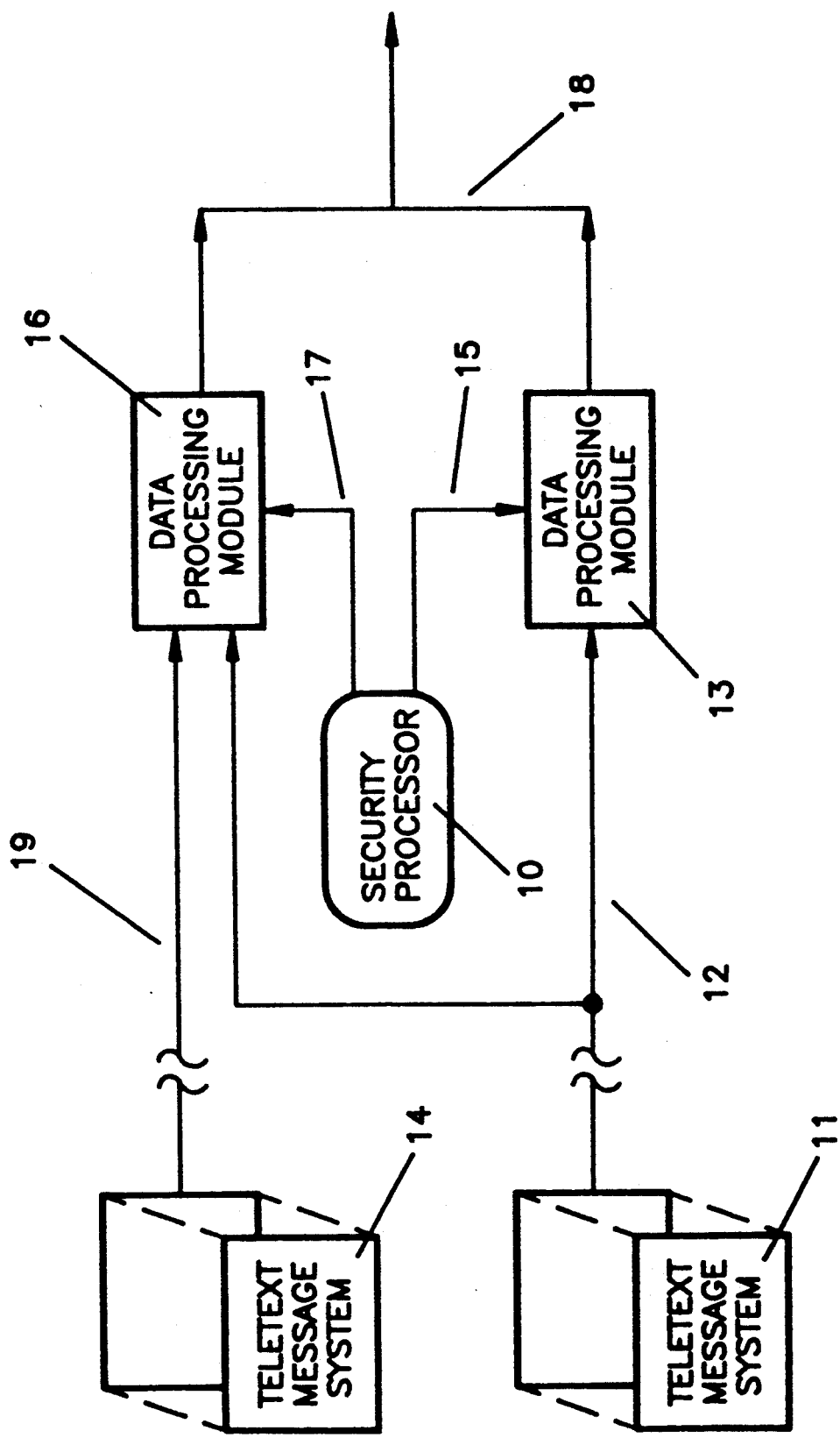
FIG. 1 is a diagram presenting the general principle of the restoring of intelligible information on fees and on the programs of a subscription television service according to the invention.

FIG. 1 shows the general principle of the invention.

The control of access to particular program elements is done generally by means of a security processor 10 in which the different fees paid by a user are recorded. These pieces of information are presented so as to provide for maximum inviolability of the system.

In the case of the "Eurocrypt" specifications, this security processor 10 is placed in a microprocessor card, making it possible, in particular, to facilitate the re-updating of certain pieces of information on account status in specific fee management centers.

The security processor 10 contains different pieces of information in binary digital form. These pieces of information are specified in the standards of the "Eurocypt" specifications. For example, a particular user may pay specific fees entitling him to view programs presenting football matches, broadcasts of interest only to doctors, broadcasts up to a certain date, and plays broadcast after 20H30.

The specific character of such fees and the account status pertaining thereto makes it necessary to have a means for consulting them in clear form, if only to ascertain that the requisite fees have really been paid.

To this end, a teletext message system 11 is used to transmit the pieces of information 12 enabling a transcoding of the digital information contained in the processor 10.

This message system 11, called a data identification message system, includes notably the following elements:

a list of subjects and levels, used to establish the link between the identifiers of subjects and levels used in the access headings and the descriptors of these subjects and levels;
a list of classes;
a list of shows;
a blackout list;
a list of moral rating identifiers;
a list of user groups;
the current date and time;
the cost of one billing unit.

A data-processing module 13 establishes the link between the transmitted data 12 and the data 15 contained in the processor 10, and gives information 18 in intelligible form.

For example, the pieces of data 12 are constituted by a table, each recording of which includes two fields:
an "index" or "identifier" field, each such field corresponding to one of the pieces of information that are encoded or capable of being encoded in the security processor 10;
a "label" field giving the intelligible information corresponding to the identifier of the first field of the same recording.

Each of the recordings is sent, for example, in the form of a scrolling cyclical bulletin.

Optionally, it is also possible to transmit pieces of data 19 from a second teletext message system 14 containing information specific to the television programs and to the conditions for obtaining access to these programs.

These pieces of data 19 may notably contain the following information for a program:
- identification of the program;
- date of broadcast of the program;
- probable starting time of a broadcast;
- real starting time;
- duration of broadcast;
- identifier of subject and level of the program;
- class identifier;
- show identifier;
- identifier of blackout zone and specification of prohibition/authorization mode;
- moral rating identifier;
- an indicator of possibility of purchase in pay-per-program mode and subscription mode (these modes are not mutually exclusive);
- the cost of the show for a purchase in advance;
- the cost of the show for a purchase on impulse;
- the cost of one time unit of the program.

In addition to the above elements, a space representing a "window" of the operator may be given with this message system. Its role is to form a link between the operator and the user for operations that are not directly accessible through the message system, for example in advertisement form.

Advantageously, a "current" page is transmitted at a higher speed than the other information. Thus, easier access is provided to information specific to currently broadcast transmissions thus enabling impulse buying.

A processing module 16 enables these pieces of information 19 to be put into shape.

Advantageously, these pieces of information 19 may use elements contained in the first message system 11. Thus, so as to reduce the number of characters to be transmitted, it is possible to transmit only indicators, the clear meaning of which is transmitted by the transcoding pieces of information 12.

The method may also be reversed. In this case, the lists of the message system 11 contain only indices, indicating literal pieces of information from the message system 14.

The two message systems 11 and 14 may be time-multiplexed.

To provide access to the service for the largest possible number of receivers and to simplify the implementation, a teletext type of encoding is used.

The data of these message systems are transmitted during the flyback frames and/or lines of the television signals, as is done for known teletext systems of the ANTIOPE or CEEFAX type. In the case of X-MAC type signals, these messages can also be transmitted in the data packets of these signals.

The invention is not restricted to the use of teletext type message systems. For, the pieces of information of the invention do not constitute pages that can be displayed directly but pieces of digital information that can be transmitted in other forms.

However, the use of teletext messages enables the use of already existing transmission and display means.

Figure 2:
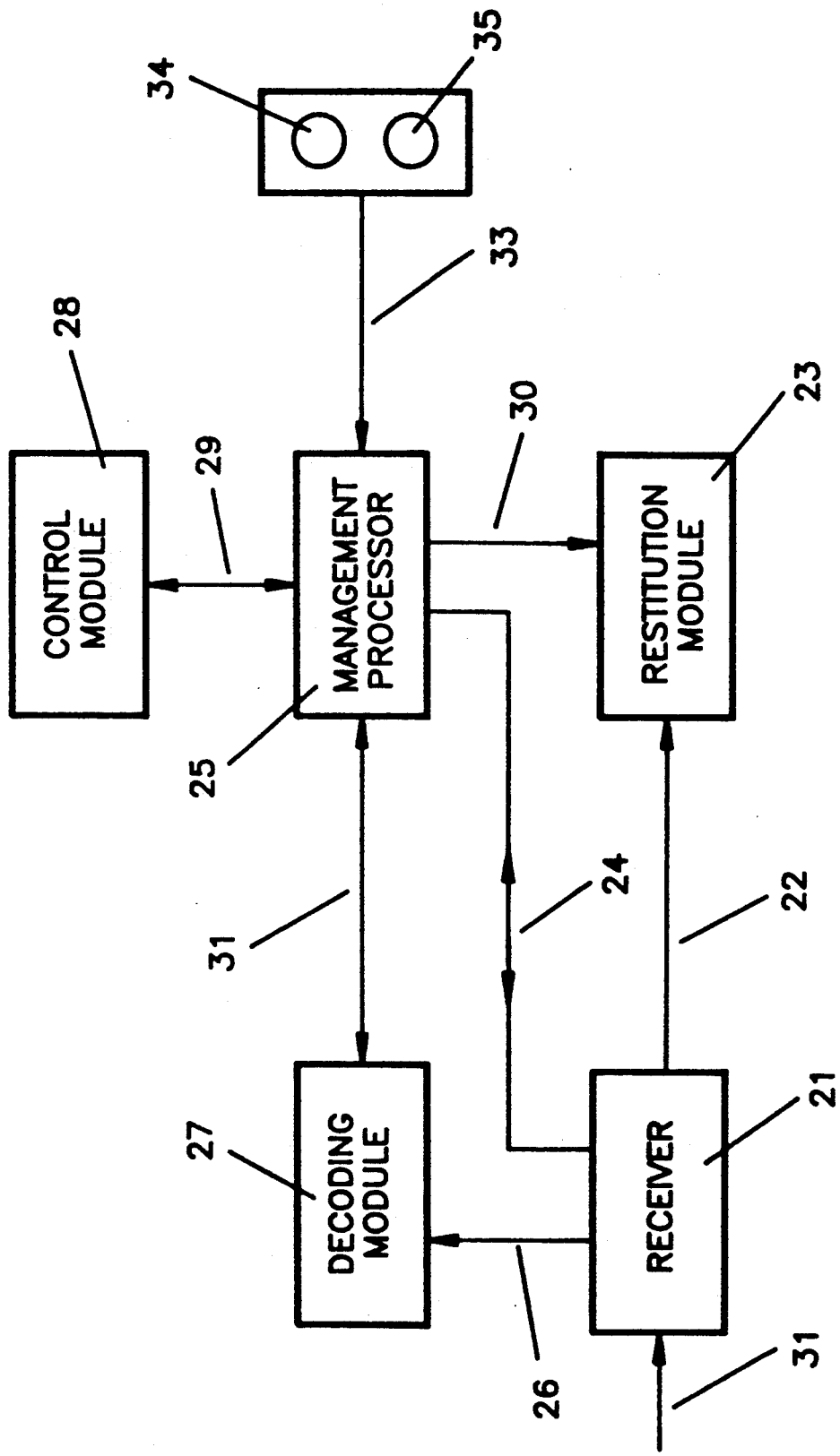
FIG. 2 is a functional diagram of a decoder implementing a device for the restoring of transmitted information according to the principle of FIG. 1.

FIG. 2 is a functional diagram of a device enabling the display of information on the audiovisual service concerned.

A receiver 21 receives the transmitted signal 28 and acquires elements of the audiovisual service concerned. Its role is to take account of the transmission encoding.

The elements 22 concerning the audiovisual service proper are sent directly towards the restitution module 23, the signalling elements 24 included in the service are sent towards a processor 25 for the management of the receiver 21 and the elements 26 of the assistance message system are sent towards a module 27 for the decoding of the pieces of information from the assistance message system.

The reception module 21 extracts the pieces of signalling information 24, describing the service received, from the incident signal 32 and transmits them to the receiver management module 25. With these pieces of data 24, the management module 25 can propose, to the user, the choice of the elements of the audiovisual service to which he wishes to obtain access.

In a context of an audiovisual service with unconditional access, these elements enable the user to enjoy the service proposed through the restitution module 23.

In the case of a service with conditional access, the user can obtain access to the service proper only if the receiver can ascertain that the requisite conditions have been fulfilled. This ascertaining is done by the access control module 28. To work properly, this module 28 receives pieces of information 29 from the receiver management module 25 which itself extracts them from the receiver 21. Herein, the role of the management module 25 is not only to select the necessary elements but also to check whether the pieces of information 24 provided are those expected by the access control module 28.

The interface with the user is provided through the restitution module 23. Through this channel, the management module 25 can transmit pieces of information 30 which enable the user to make his choices from among the possibilities offered by the service.

In the case of a service with controlled access, it is by this channel that the receiver can give either the factors of selection for the payment of new fees or the pieces of information contained in the access control module 28, enabling him to manage it as he pleases. The addition of an assistance message system enables these latter facilities to be used more easily in the social context of a group making the elements of the access control more explicit.

The assistance elements are provided in a particular service, for which the module 27 provides the selection and decoding according to the commands 31 received from the management module 25. On the basis of these pieces of information, the management module 25 puts the assistance messages into shape before presenting them to the user on the restitution module 23.

Herein, the means for restoring the information in an intelligible form are means for achieving display on television screens by means of a character generator which may, advantageously, be common with a receiver of teletext bulletins.

These restoring means may also be voice synthesis means or any other means of restitution.

The user may express requests 33, for example in a simple way by pressing two buttons 34, 35 on the front of a terminal, one button 34 identified by "display" and the other 35 identified by "consultation". This activation may also be achieved by an infrared remote using these buttons 34, 35.

Another possibility, enabling a greater interaction, is the use of a fuller keyboard.

What is claimed is:

1. In a subscription television and/or radio system in which a subscriber can purchase selected items of at least one television and/or radio program broadcast by said system, each subscriber owning a security processor in which pieces of data relative to said selected items are written in a coded form, a device for the intelligible consultation of said data relative to said selected items written in said security processor, said device including:

means for expressing by said subscriber a request for an intelligible message concerning at least one of said selected items;

means for receiving at least one correspondence table, said at least one correspondence table being multiplexed with said at least one television and/or radio program and being regularly transmitted, said at least one correspondence table associating to each piece of data susceptible to be written in said security processor a corresponding intelligible piece of message;

means for processing said request of the subscriber, transcribing pieces of data written in a coded form in said security processor and corresponding to said request in an intelligible message, using said at least one correspondence table; and means for supplying said intelligible message to said subscriber, so as to make it known by said subscriber.

2. A system for broadcasting a signal including at least one subscription program, in which a subscriber can purchase selected items of said at least one subscription program broadcast by said system, each subscriber owning a security processor in which pieces of data relative to said selected items are written in a coded form, wherein said signal further includes at least one correspondence table multiplexed with said at least one subscription program and regularly transmitted, said at least one correspondence table associating to each piece of data susceptible to be written in a coded form in a security processor a corresponding intelligible piece of message, said at least one correspondence table being used in a device for the intelligible consultation of said data relative to said selected items written in a coded form in said security processor, said device including:

means for expressing by said subscriber a request for an intelligible information concerning at least one item written in a coded form in said security processor;

means for extracting said at least one correspondence table from said signal;

means for processing said request of the subscriber, transcribing pieces of data written in a coded form in said security processor and corresponding to said request in an intelligible message, using said at least one correspondence table; and means for supplying said intelligible message to said subscriber, so as to make it known by said subscriber.

3. A device according to claim 1, or 2, wherein said at least one table of correspondence include at least one of the pieces of message belonging to the group including:
   program titles;
   information on subjects and/or levels;
   information on classes of programs;
   information on timings of shows;
   information on geographical zones;
   information on moral rating;
   information on price;
   information on time schedules;
   information for groups of users.

4. A device according to claims 1 or 2 wherein said at least one table of correspondence is transmitted by means of a first teletext message system (or: is transmitted in a teletext message format).

5. A device according to claim 4, wherein said means for processing take account of a second teletext message system containing complementary pieces of information relative to said items of program.

6. A device according to claim 5 comprising means for selectively controlling the reading of said complementary pieces of information as a function of the data relative to the selected items written in said security processor.

7. A device according to claim 5, wherein said complementary pieces of information contained in the second teletext message system includes complementary pieces of data encoded in the same format as the pieces of data contained in said security processor, said means for processing carrying out a transcription of said encoded complementary pieces of data of said complementary pieces of information by means of said at least one correspondence table.

8. A device according to claims 1 or 2 wherein said at least one correspondence table is transmitted in the lines of the vertical blanking intervals of a television signal.

9. A device according to claims 1 or 2 wherein said means for supplying include character generator means and display means fed by said character generator means.

10. A device according to claims 1 or 2 wherein said at least one correspondence table is transmitted in data packets multiplexed with said at least one program.

11. A device according to claims 1 or 2 wherein said character generator means works according to a teletext standard.

12. A device for presenting messages to a subscriber to a subscription broadcast system that allows selectable purchase of programs broadcast by the system, with the subscriber having a security processor in which coded information relative to the programs can be stored, the device comprising:

a keyboard input unit for requesting information concerning programs;

a receiver configured to accept at least one regularly transmitted correspondence table multiplexed with at least one program, the at least one correspondence table associating coded information in the security processor with a message;

a processor configured to use the at least one correspondence table for selecting the message associated with the coded information present in the security processor, the message being responsive to a request by the subscriber for information concerning programs; and a display unit for presenting the message selected by the processor in response to the request for program information by the subscriber.

13. A system for broadcasting a subscription program only receivable by subscribers having a security processor with coded information concerning the subscription program, the subscription program further including a multiplexed transmitted correspondence table associating coded information in the security processor and a message transmitted as a portion of the correspondence table,
  wherein the message is displayed by a device for presenting information related to the coded information in the security processor in response to subscriber inquiry, said device comprising:
  means for requesting a message concerning a program identified by coded information in the security processor;
  means for extracting the multiplexed correspondence table from the subscription program;
  means for converting coded information in the security processor into the message using the correspondence table; and
  means for displaying the message to the subscriber.

* * * * *